United States Patent
Dong

[11] Patent Number: 5,914,778
[45] Date of Patent: Jun. 22, 1999

[54] AUTOMATIC LASER LEVEL

[76] Inventor: Dawei Dong, P.O. Box 4697, Santa Clara, Calif. 95056

[21] Appl. No.: 09/088,528

[22] Filed: Jun. 1, 1998

[51] Int. Cl.[6] ............................... G01C 5/00; G01C 9/02
[52] U.S. Cl. .............................................. 356/247; 33/291
[58] Field of Search ..................... 356/255, 253, 356/138, 147, 148, 149, 250, 247, 146, 248, 153, 154; 33/286, 290, 291, 293, 294, 295, 297, 298, 227, 228, 283

[56] References Cited

U.S. PATENT DOCUMENTS

| | | | |
|---|---|---|---|
| 3,771,876 | 11/1973 | Ljungdahl et al. | 356/138 |
| 4,471,530 | 9/1984 | Kirven | 33/174 R |
| 4,820,041 | 4/1989 | Davidson et al. | 356/1 |
| 4,854,704 | 8/1989 | Funazaki et al. | 356/250 |
| 4,993,161 | 2/1991 | Borkovitz | 33/291 |
| 5,272,814 | 12/1993 | Key | 33/290 |
| 5,552,886 | 9/1996 | Kitajima et al. | 356/250 |
| 5,724,744 | 3/1998 | Bozzo | 33/291 |

Primary Examiner—Frank G. Font
Assistant Examiner—Michael P. Stafira
Attorney, Agent, or Firm—The Kline Law Firm

[57] ABSTRACT

A low cost automatic laser level instrument uses a solid laser diode module as the laser source. It is not necessary to adjust the laser diode module to make the center ray align with the concentric axis. The only requirement is adjusting a reflecting mirror or prism so that the center ray is vertical to the rotating axis. In other words, any ordinary diode module can be used. The device levels automatically by using a knife edge that is propped up by a universal ring. The pendulum remains steady under the influence of a magnetic field. The magnetic field functions as a damper, which stops the swinging of the pendulum very quickly. After adjusting the center ray to be perpendicular to the pendulum (which points to the earth's core), the device will produce a standard level line.

5 Claims, 11 Drawing Sheets

AUTOMATIC LASER LEVEL

BACKGROUND OF THE INVENTION

The present invention relates generally to laser leveling instruments, and more particularly, relates to a rotary laser leveling instrument capable of multiple purposes of usage. The device can automatically produce a standard level line suitable for construction.

New uses for automatic laser devices are constantly emerging. Some of the laser devices have become products employed in construction projects like commercial excavating, laying foundations, installing drop ceilings, etc. Instruments of this kind save considerable time during initial layout of a construction job compared to other traditional tools. The tools can also be used by do-it-yourself builders for laying tile, mounting cabinets, installing counter tops, and building outdoor decks. However, laser levels have not achieved widespread use because they typically cost thousands of dollars.

SUMMARY OF THE INVENTION

The present invention is a low cost automatic laser level instrument. The device uses a solid laser diode module as the laser source. It is not necessary to adjust the laser diode module to make the center ray align with the concentric axis. Usually, the laser diode module has a deviation that prohibits it from producing concentric circles as it rotates. However, for his previous invention, U.S. Pat. No. 5,754,582, the inventor invented a method and device to adjust the deviated laser beam so as to produce concentric circles. The method causes the beam to align with the concentric axis by turning the noncollimated laser module along the concentric axis. A device using this technique will have zero deviation when it is used properly. The adjusting method for the present invention is different from that used previously. There is no need to adjust the diode module. The only requirement is adjusting a reflecting mirror so that the center ray is vertical to the rotating axis. In other words, any ordinary diode module can be used for the device of the present invention.

The device levels automatically by using a knife edge that is propped up by a universal ring. The pendulum remains steady under the influence of a magnetic field. The magnetic field functions as a damper, which stops the swinging of the pendulum very quickly. After adjusting the center ray to be perpendicular to the pendulum (which points to the earth's core), the device of the present invention will produce a standard level line.

DETAILED DESCRIPTION OF THE PREFERRED EMBODIMENT

Figure 1A:
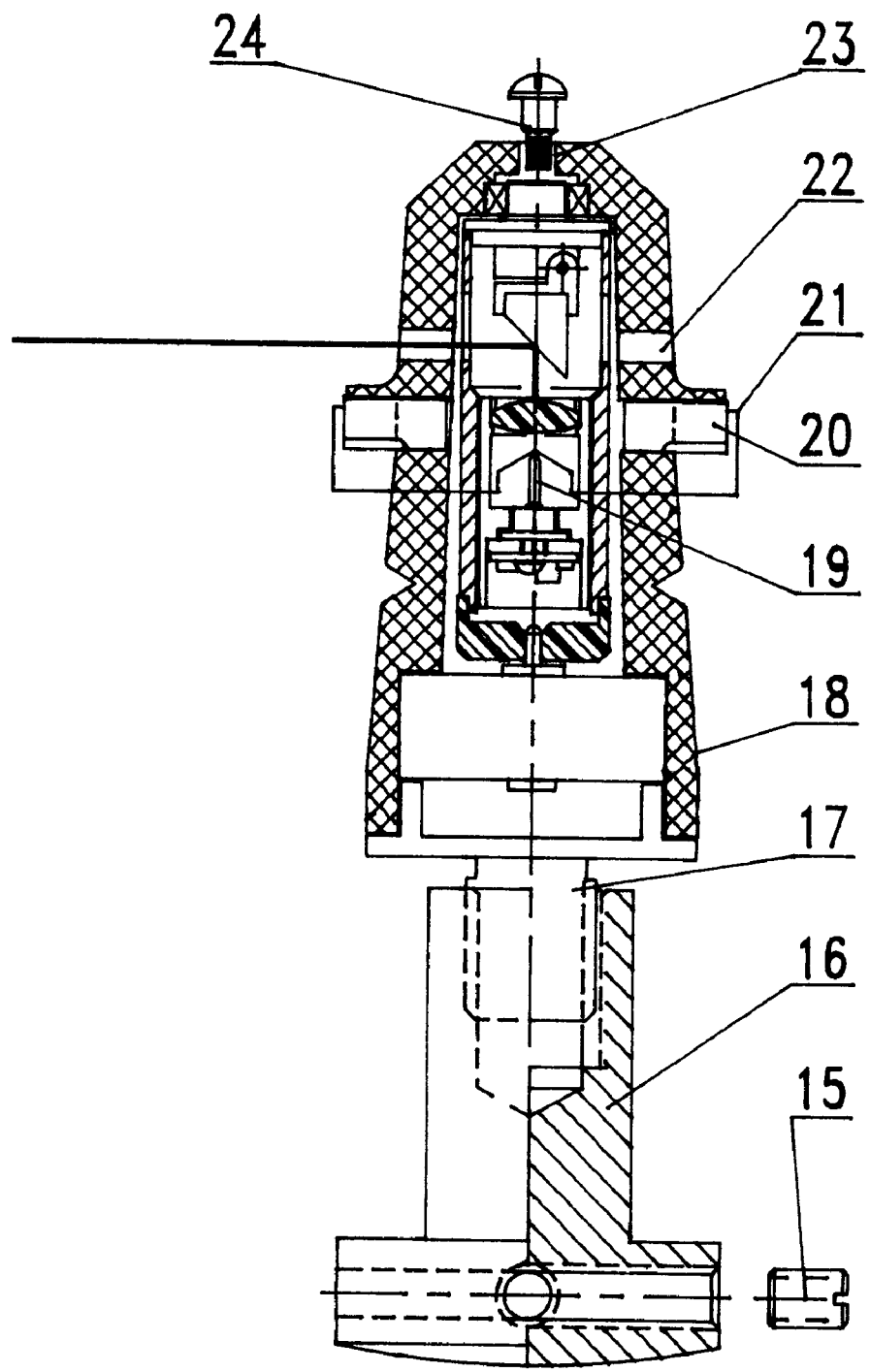
FIGS. 1a+b are cross sectional views of the pendulum assembly of the present invention, the automatic laser level.
Figure 1B:
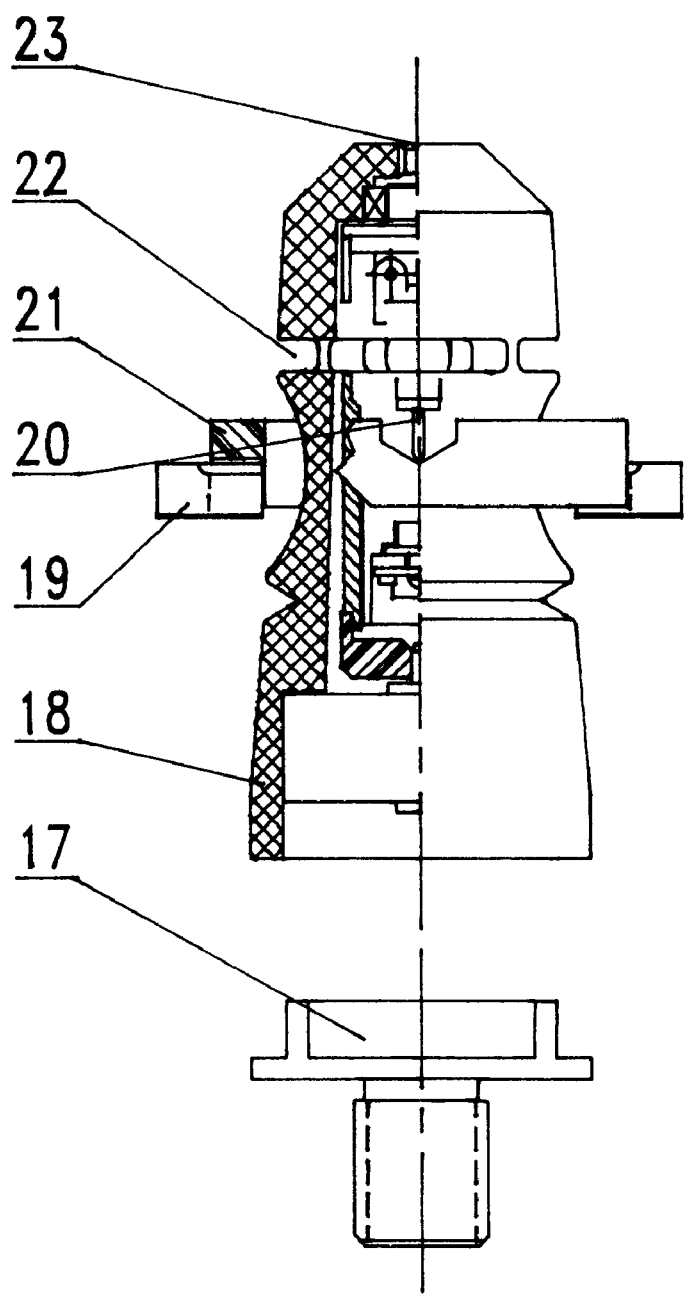
FIG. 1c is a cross sectional view of the laser assembly.
Figure 1C:
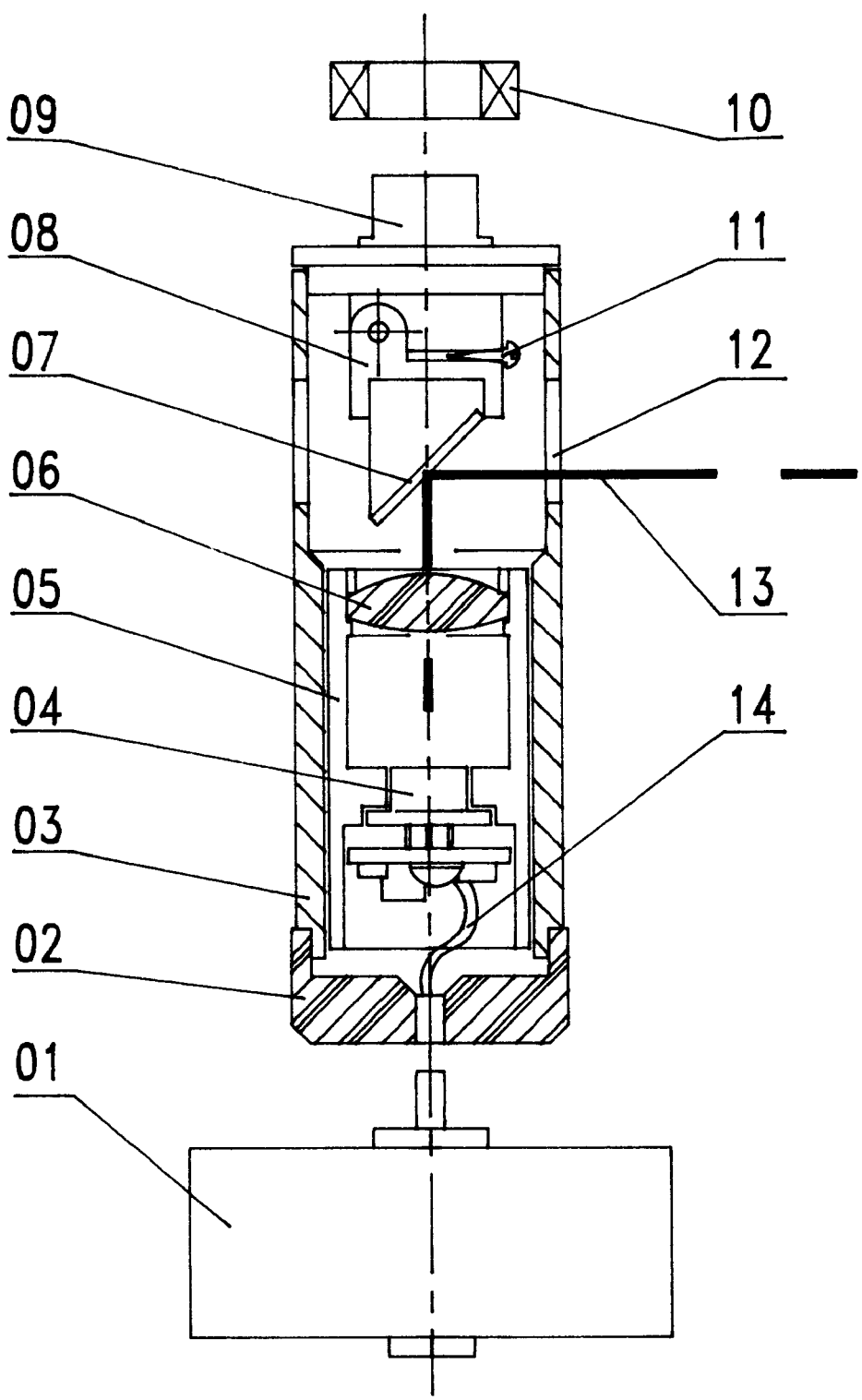

FIGS. 1a–c illustrate the core elements of the automatic laser level, the pendulum assembly and the laser assembly.

Referring first to FIG. 1c, the laser assembly comprises a speed-controllable D.C. motor 1 joined by a joint 2 to a rotating tube 3. In the preferred embodiment, the joint 2 is made from nylon, and the rotating tube 3 is made from aluminum. The joint 2 functions both as a connection means to drive the tube 3 from the motor 1, and as an insulation means between the motor 1 and the tube 3.

A laser module 5 is situated in the rotating tube 3. The laser module 5 includes a laser diode with drive circuit 4 and a lens 6. A reflecting mirror 7 is installed on an adjustable stand 8. The stand 8 is connected to the upper joint 9, which is mounted in the rotating tube 3. An upper end of the upper joint 9 is contained in a bearing 10. The combination of the bearing 10 and the joint 2 on the motor 1 causes the rotating tube 3 to rotate smoothly.

An adjusting screw 11 is provided to adjust the angle of the mirror 7. The mirror 7 reflects the light beam from the laser module 5 through a window 12. A second window is placed in the rotating tube opposite the window 12 so that the tube 3 is balanced properly for spinning equilibrium. The second window also provides access to make adjustments to the laser module 5. In the preferred embodiment, the windows are 6 mm square.

When the laser module 5 is properly adjusted, a laser beam 13 is emitted perpendicular to the longitudinal axis of the rotating tube 3. A cathode wire 14 of the laser module 5 is affixed to the motor 1.

Referring now to FIGS. 1a+b, the pendulum assembly comprises a pendulum 16 whose position is adjusted by two adjusting screws 15. The adjusting 15 screws are situated so as to form a right angle. The pendulum 16 is threadably joined to a main tube 18 at a joint 17 which allows the length of the pendulum 16 to be adjusted slightly.

The pendulum 16 is mounted on a first knife edge 19 attached to an outer case, and a second knife edge 20 affixed on a universal ring 21. The first knife edge 19 forms a 90° angle to the second knife edge 20. A peripheral window 22 in the outer case allows the laser beam 13 to be seen outside the outer case. The window is open 360° excepting the required support pillars 28 that support an upper cap 29 (both shown in FIG. 2a). In the preferred embodiment, four 2 mm pillars 28 are utilized.

An electric brush 24 is secured to the top of the outer case of the pendulum assembly in a threaded hole 23. The electric brush 24 is connected to the anode wire of the rotating tube 3. The laser assembly becomes functional when the mains are connected through the electric brush 24 and the motor 1.

Figure 2A:
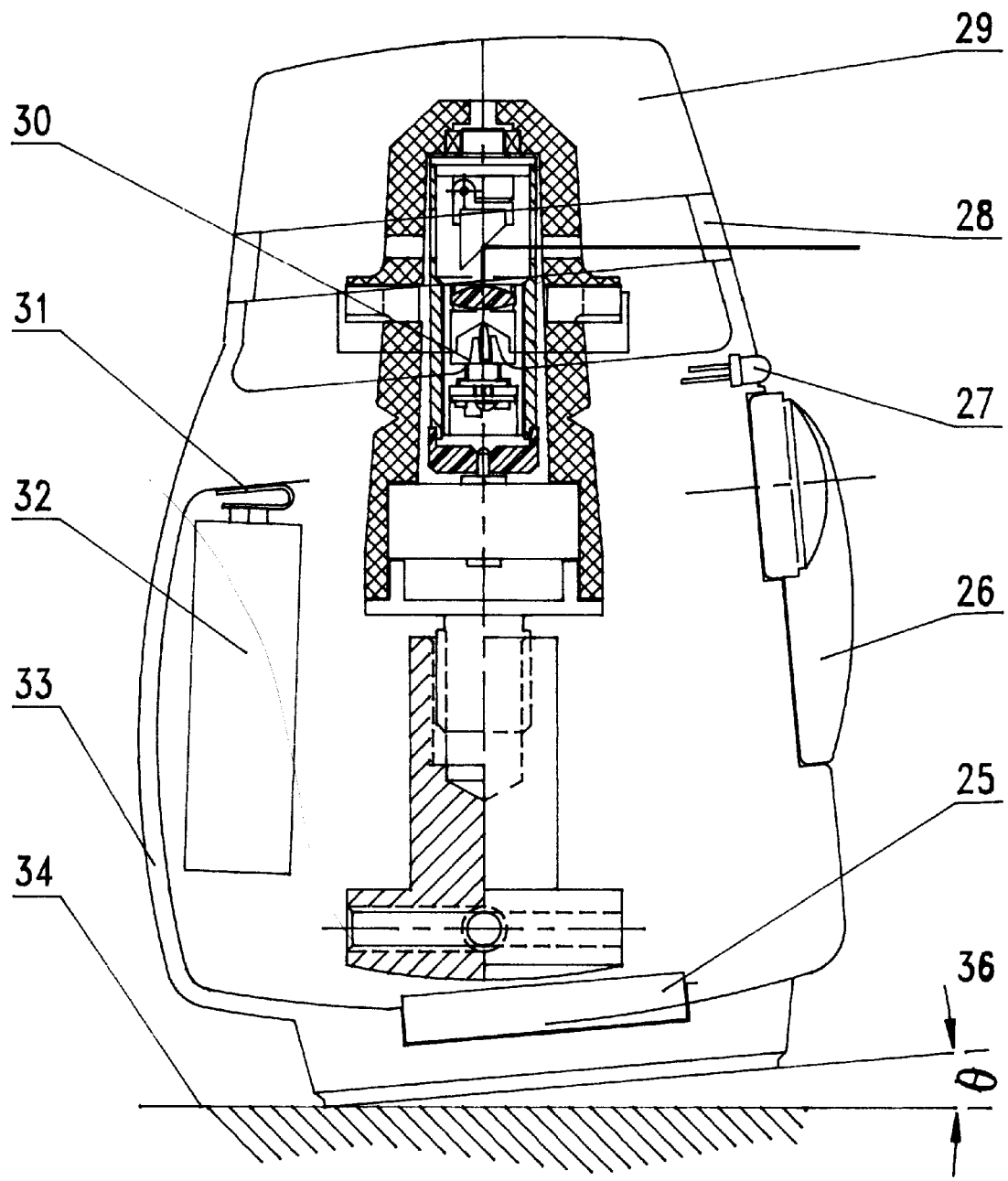
FIG. 2a illustrates the exterior of the device of the present invention.
Figure 2B:
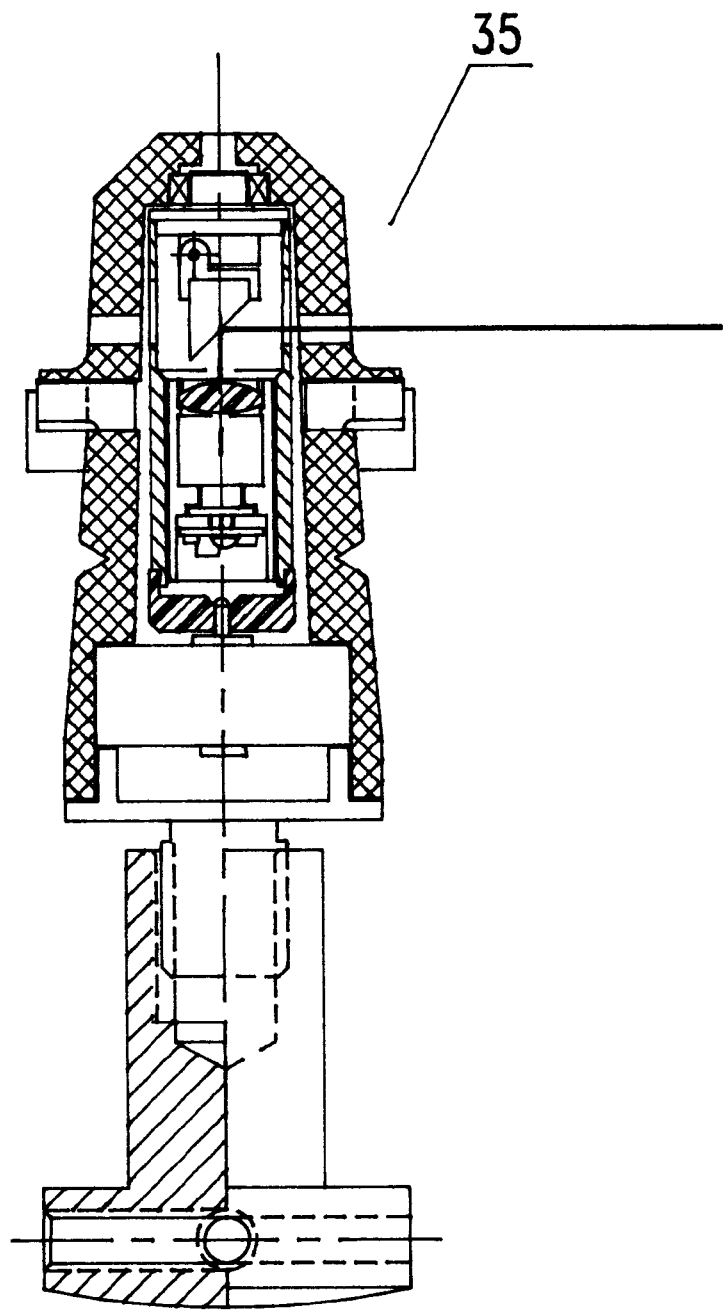
FIG. 2b is a cross section of the interior of the device.

FIG. 2a illustrates the laser/pendulum assembly 35 positioned in the exterior packaging of the device. The outer case comprises the upper cap 29 and a lower portion 33. A switch 26 functions both to control the mains and to secure and release the rotating tube 3. An LED 27 is provided to indicate the state of the switch 26. The outer case further includes a slot 30 that receives knife edge 19. A spring plate 31 electrically connects the power supply 32 (three AA 4.5 V batteries).

A magnetic field created by a magnet 25 functions as a damper for the pendulum 16. When the automatic laser level is placed on a surface 34 angled θ degrees from horizontal, the pendulum will of course begin swinging about the vertical position. With the magnet 25 positioned below the pendulum 16, the swinging motion is very quickly damped, so that the pendulum 16 quickly reaches equilibrium in a vertical orientation. Thus the automatic laser level, when the laser module 5 is properly installed, will always generate a horizontal line regardless of the surface on which it is placed.

Figure 3A:
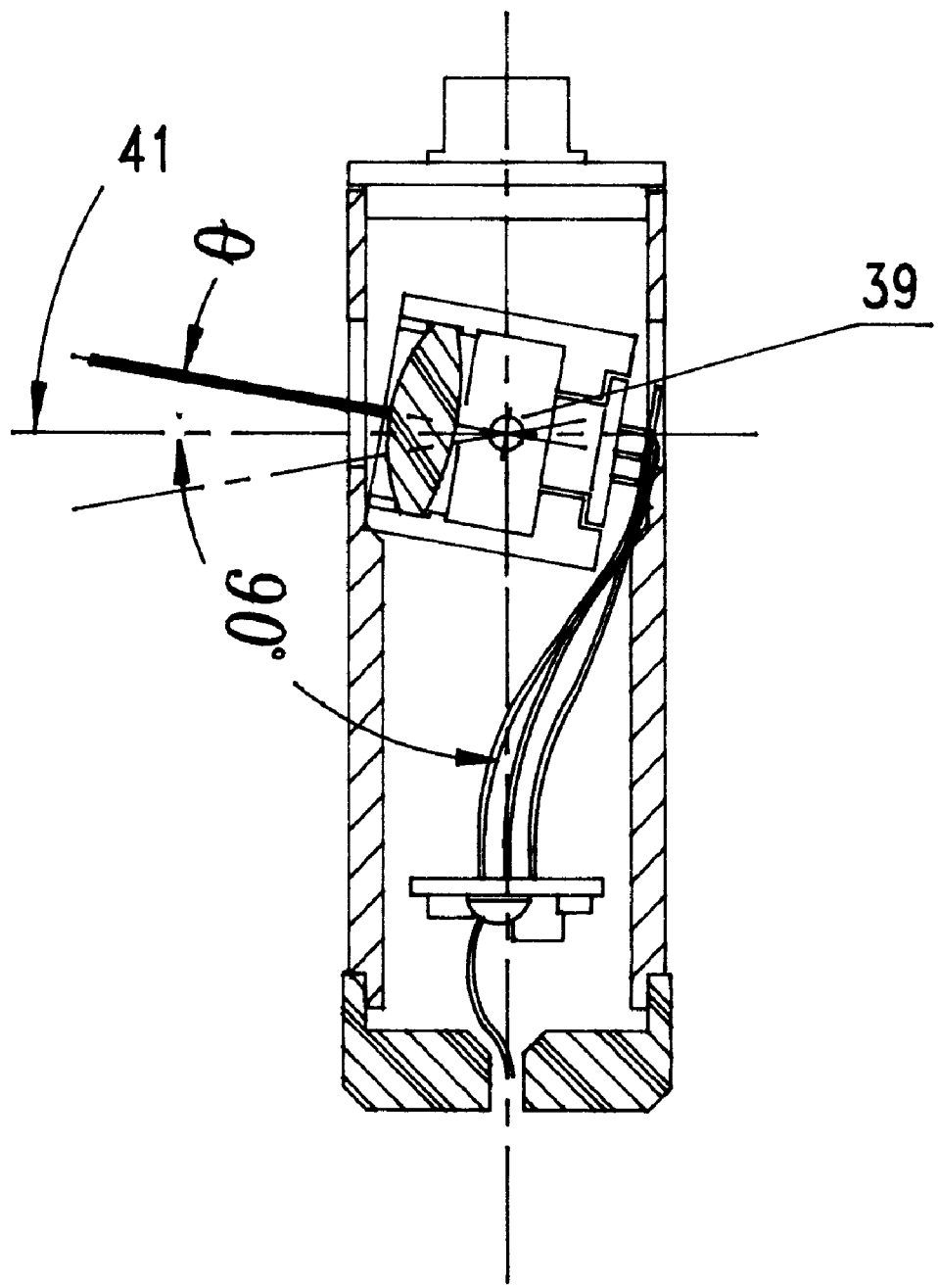
FIGS. 3a–3c depict an alternate method of automatically producing a level line.
Figure 3B:
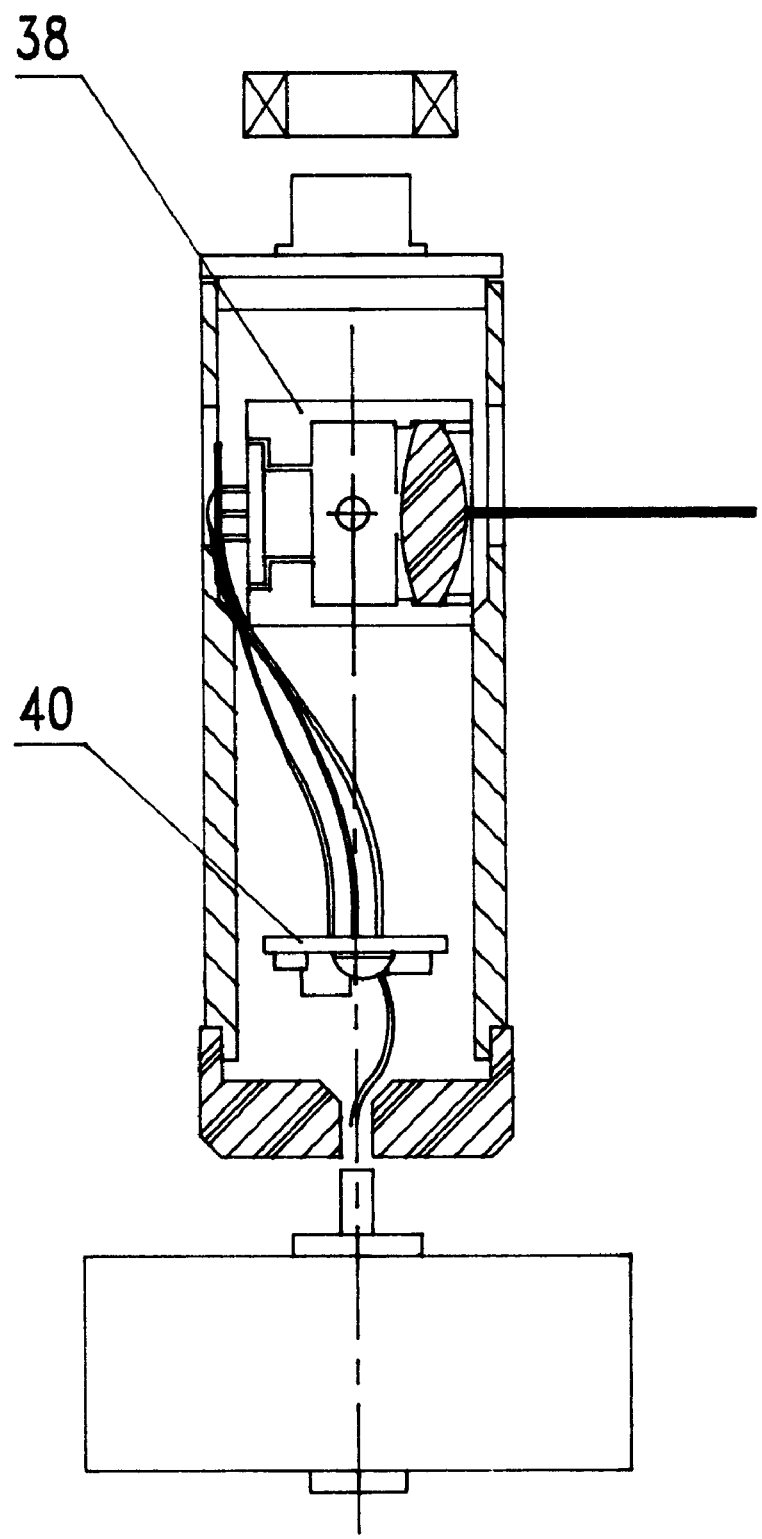
Figure 3C:
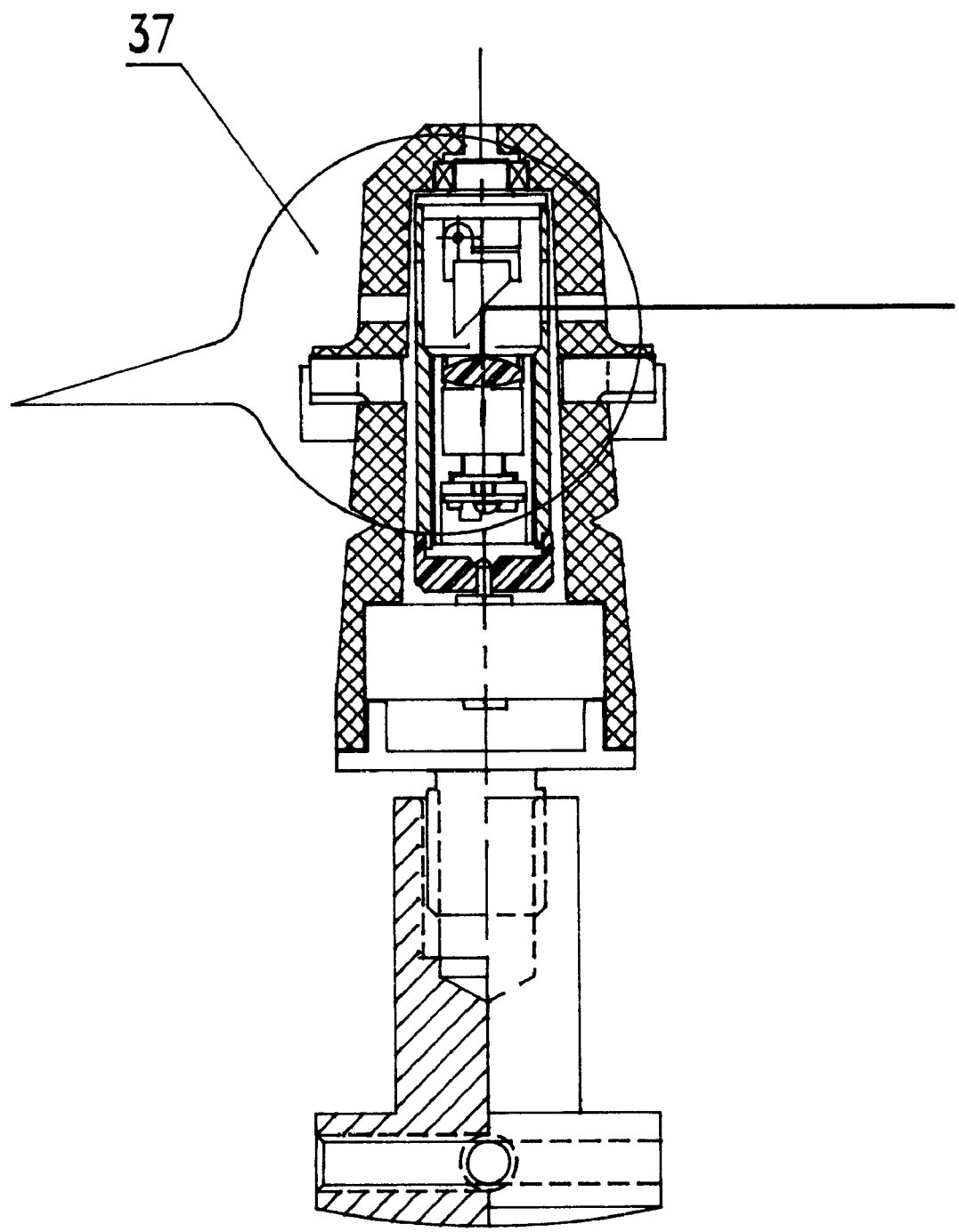

FIGS. 3a–3c illustrate an alternate arrangement for the laser module 5. In this configuration, the module is situated so as to emit a beam 41 in the horizontal plane. By adjusting the angle of the module about axis 39, the user can ensure that a level line is generated. With this configuration, the mirror 7 can be eliminated. This eliminates losing light or beam deviation caused by reflecting the beam off the mirror 7. Moreover, the drive circuit and the laser diode can be installed separately so that ordinary and cheaper components can be used for the device.

Figure 4A:
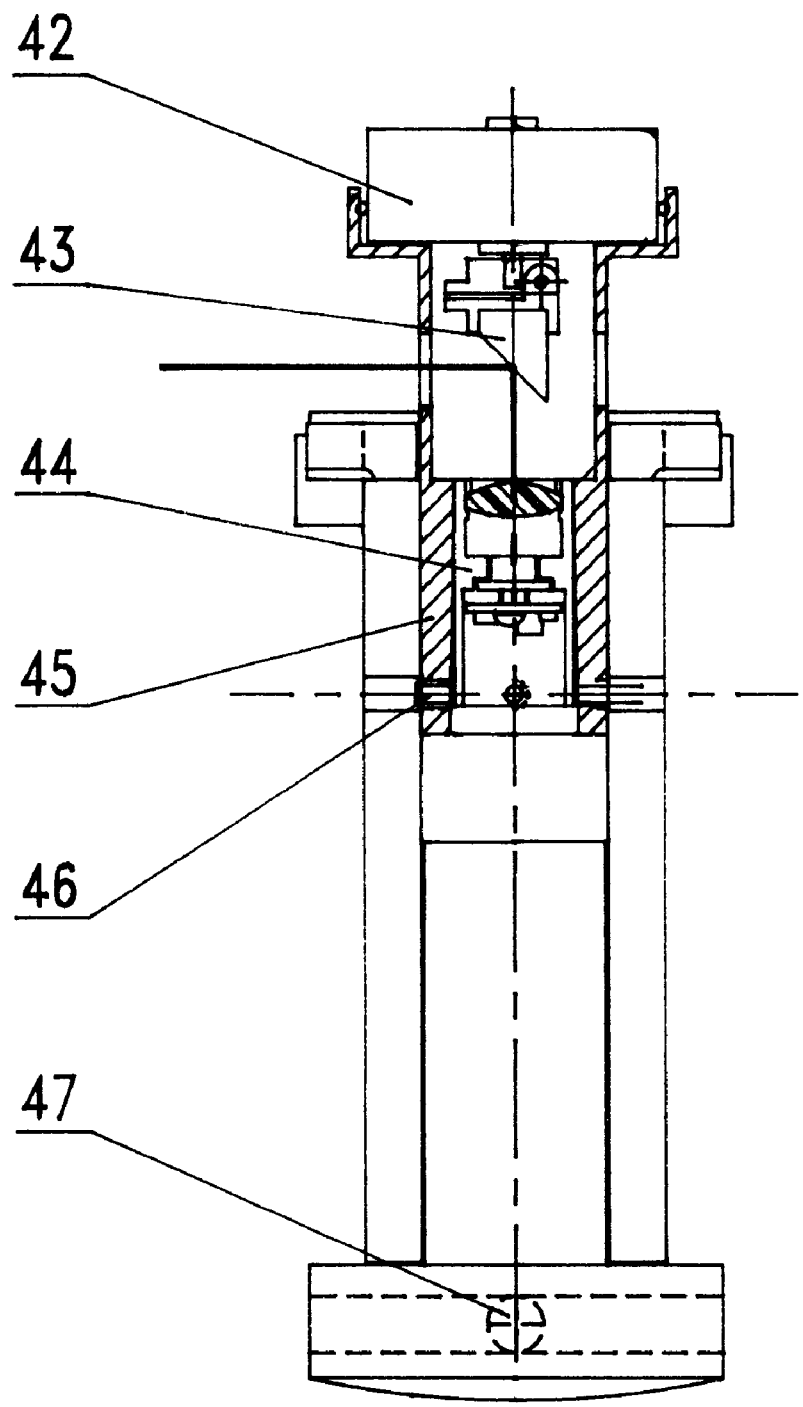
FIGS. 4a–4c illustrate alternate methods of automatically producing a level line.

FIG. 4a illustrates an alternate embodiment of the laser/pendulum assembly for the automatic laser level. In this embodiment, motor 42 rotates a 90° prism 43 situated inside a simple fixed tube 45 as opposed to a rotating tube. The position of prism 43 can be adjusted via screw 46 to ensure that the beam emitted from the laser module 44 is orthogonal to the longitudinal axis of the device.

Figure 4B:
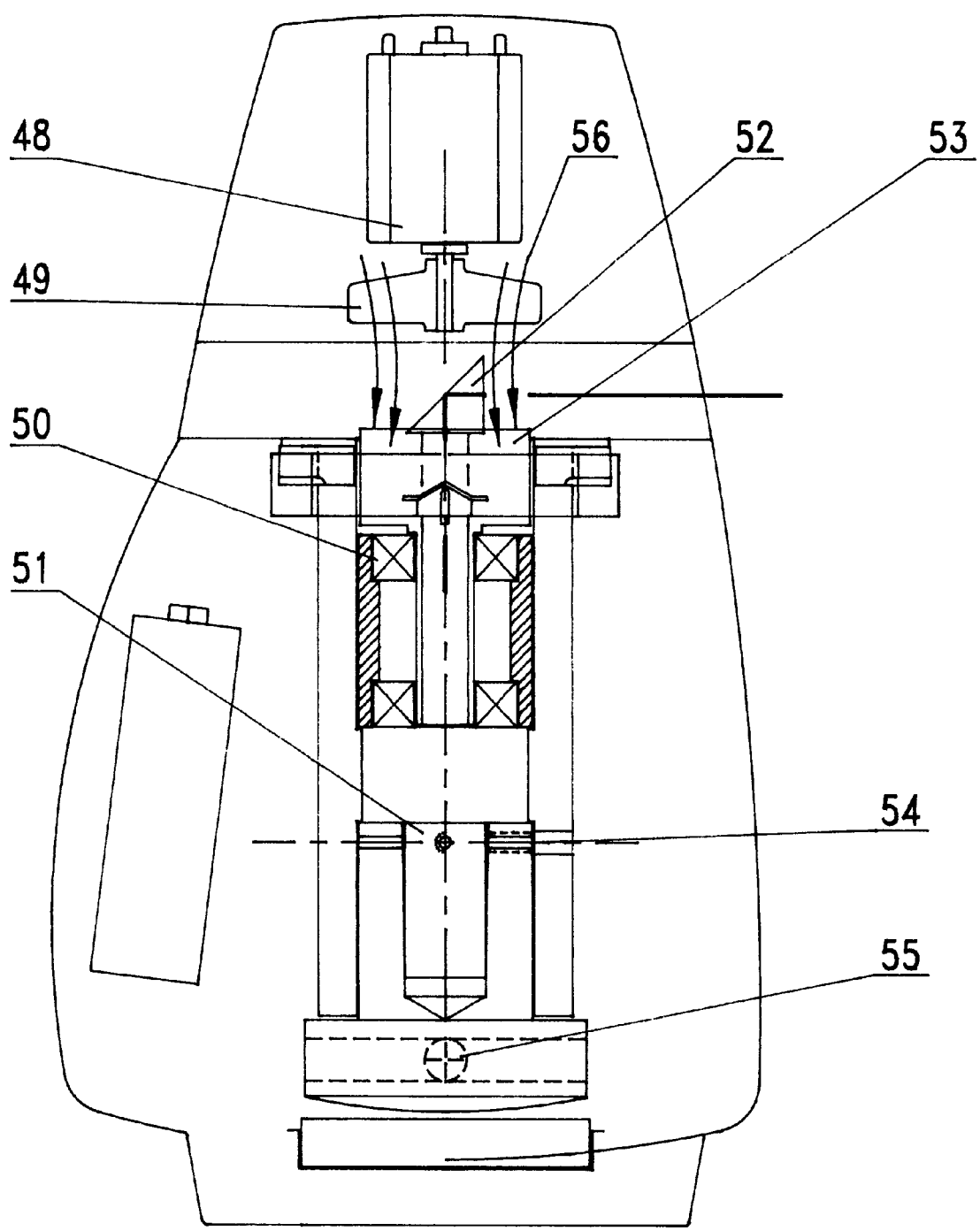
Figure 4C:
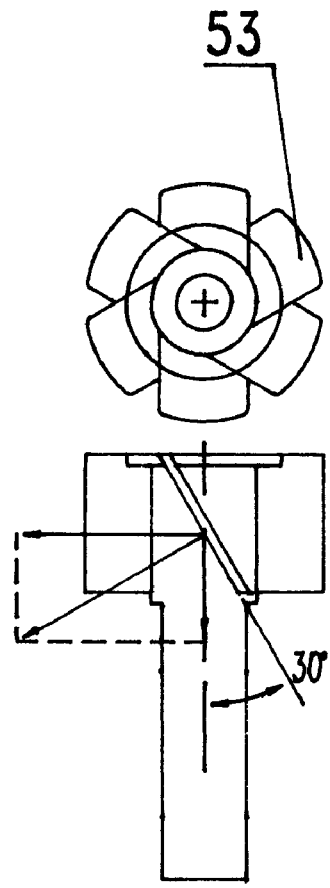

FIGS. 4b+c illustrates another alternate method of rotating the laser beam. In this embodiment, a small axial fan 49 driven by motor 48 is used to rotate the 90° prism 52. The axial fan 49 creates an airflow 56 which drives vanes of a second fan 53. An ordinary laser module 51 reflects its beam through the prism 52. The angle of the prism can be adjusted by screw 54. The laser/pendulum assembly is mounted in two sets of bearings 50 so that the assembly rotates smoothly.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed:

1. An automatic laser level comprising:
   a laser assembly and a pendulum assembly rotatably mounted in an outer case;
   said laser assembly comprises a motor joined by an insulating joint to a rotating tube, and a laser module situated in said rotating tube,
   a mirror is installed on an adjustable stand to direct a light beam emitted from said laser module through a first window in said rotating tube, said adjustable stand is connected to an upper joint mounted in said rotating tube, an upper end of said upper joint is contained in a bearing so that said rotating tube rotates smoothly, an adjusting means is provided to adjust an angle of said mirror so that said beam is emitted at a 90° angle to a longitudinal axis of said laser assembly and said pendulum assembly, and a second window is placed in said rotating tube opposite said first window so that said rotating tube is balanced properly;
   said pendulum assembly comprises a pendulum mounted on a first knife edge mounted on said outer case and a second knife edge mounted on a universal ring, said first knife edge forms a 90° angle to said second knife edge, and a magnet situated beneath said pendulum so that a magnetic field generated by said magnet operates on said pendulum; and
   said outer case comprises a narrow peripheral opening that allows said beam to be seen outside said outer case, said opening extends around said outer case and is broken only by support pillars that support an upper cap on a lower portion of said outer case; such that
   when said level is placed on a non-horizontal surface, a swinging motion of said pendulum is damped by said magnetic field, thereby quickly establishing said longitudinal axis in a true vertical position, such that when said motor is activated to rotate said rotating tube, a level line is created by said light beam that covers an arc of rotation of said rotating tube.

2. An automatic laser level comprising:
   a laser assembly and a pendulum assembly rotatably mounted in an outer case;
   said laser assembly comprises a motor joined by an insulating joint to a rotating tube, and a laser module situated in said rotating tube,
   said laser module is mounted so as to emit, through a first window in said rotating tube, a light beam projected at a 90° angle to a longitudinal axis of said laser assembly, and a second window is placed in said rotating tube opposite said first window so that said rotating tube is balanced properly, an adjusting means is provided to adjust an angle of said laser module so that said beam is emitted at a 90° angle to a longitudinal axis of said laser assembly and said pendulum assembly;
   said pendulum assembly comprises a pendulum mounted on a first knife edge mounted on said outer case and a second knife edge mounted on a universal ring, said first knife edge forms a 90° angle to said second knife edge, and a magnet situated beneath said pendulum so that a magnetic field generated by said magnet operates on said pendulum; and
   said outer case comprises a narrow peripheral opening that allows said beam to be seen outside said outer case, said opening extends around said outer case and is broken only by support pillars that support an upper cap on a lower portion of said outer case; such that
   when said level is placed on a non-horizontal surface, a swinging motion of said pendulum is damped by said magnetic field, thereby quickly establishing said longitudinal axis in a true vertical position, such that when said motor is activated to rotate said rotating tube, a level line is created by said light beam that covers an arc of rotation of said rotating tube.

3. An automatic laser level comprising:
   a laser assembly and a pendulum assembly mounted in a fixed tube in an outer case;
   said laser assembly comprises a driving means that drives a rotating prism and a laser module situated in said rotating tube,
   said prism is installed on an adjustable stand to direct a light beam emitted from said laser module through an opening in said outer case, a adjusting means is provided to adjust an angle of said prism so that said beam is emitted at a 90° angle to a longitudinal axis of said laser assembly and said pendulum assembly;
   said pendulum assembly comprises a pendulum mounted on a first knife edge mounted on said outer case and a second knife edge mounted on a universal ring, said first knife edge forms a 90° angle to said second knife edge, and a magnet situated beneath said pendulum so that a magnetic field generated by said magnet operates on said pendulum; and
   said outer case comprises a narrow peripheral opening that allows said beam to be seen outside said outer case, said opening extends around said outer case and is broken only by support pillars that support an upper cap on a lower portion of said outer case; such that
   when said level is placed on a non-horizontal surface, a swinging motion of said pendulum is damped by said magnetic field, thereby quickly establishing said longitudinal axis in a true vertical position, such that when said driving means is activated to rotate said rotating tube, a level line is created by said light beam that covers an arc of rotation of said rotating tube.

4. The automatic laser level of claim 3 wherein:

said driving means is an electric motor.

5. The automatic laser level of claim 3 wherein:

said driving means is a fan that creates an airflow that contacts and rotates vanes mounted on top of said prism, thereby causing said prism to rotate.

\* \* \* \* \*